US006968923B2

(12) United States Patent
Schmaeman

(10) Patent No.: US 6,968,923 B2
(45) Date of Patent: Nov. 29, 2005

(54) REDUCED NOISE VALVE STACK CONNECTION

(75) Inventor: Dale E. Schmaeman, Ventura, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 329 days.

(21) Appl. No.: 10/631,978

(22) Filed: Jul. 30, 2003

(65) Prior Publication Data

US 2005/0023075 A1   Feb. 3, 2005

(51) Int. Cl.[7] .................. F01N 1/24; E04F 17/04; F23D 14/70
(52) U.S. Cl. .................. 181/252; 181/224; 239/397.5; 239/590.3
(58) Field of Search ................ 181/230, 252, 181/256, 267, 271, 259, 224, 226; 137/599.14; 239/132.3, 397.5, 590.3; 138/37, 38; 285/187

(56) References Cited

U.S. PATENT DOCUMENTS

| | | | | | |
|---|---|---|---|---|---|
| 1,302,300 | A | * | 4/1919 | Brinkman | 181/279 |
| 3,473,626 | A | * | 10/1969 | Toda et al. | 181/237 |
| 3,635,309 | A | * | 1/1972 | Nemcansky et al. | 181/267 |
| 4,072,170 | A | * | 2/1978 | Sagner et al. | 137/599.01 |
| 4,315,558 | A | * | 2/1982 | Katayama | 181/227 |
| 4,624,220 | A | * | 11/1986 | Olsson | 122/379 |
| 4,785,909 | A | * | 11/1988 | Young | 181/252 |
| 4,953,659 | A | * | 9/1990 | Norris | 181/257 |
| 5,266,754 | A | * | 11/1993 | Swift | 181/230 |
| 5,390,896 | A | * | 2/1995 | Smirl | 251/127 |
| 6,062,268 | A | * | 5/2000 | Elsasser et al. | 138/121 |
| 6,343,672 | B1 | * | 2/2002 | Petela et al. | 181/224 |

FOREIGN PATENT DOCUMENTS

| | | | | |
|---|---|---|---|---|
| JP | 60247005 | A * | 12/1985 | F01N 1/24 |
| JP | 10132186 | A * | 5/1998 | F16L 51/02 |

* cited by examiner

Primary Examiner—Edgardo San Martin
(74) Attorney, Agent, or Firm—Stetina Brunda Garred & Brucker

(57) ABSTRACT

Disclosed is a silencer system configured to allow for thermal growth thereof while attenuating noise created by expansion of high-pressure fluid flowing therethrough. The silencer system comprises a tubular inner sleeve, a tubular flexible bellows, a tubular vent stack and a muffler disc. The inner sleeve has a sleeve inlet and a sleeve outlet. The inner sleeve is concentrically disposed in spaced relation within the bellows which is concentrically disposed in spaced relation within the vent stack. The bellows is configured to allow for axial and lateral movement of the inner sleeve relative to the vent stack when fluid passes through the silencer system to minimize excessive deflective forces and bending moments on the silencer system. The muffler disc is oriented relative to the sleeve outlet such that the high-pressure fluid impinges the muffler disc prior to creating shockwaves which may otherwise result in the production of high noise levels.

20 Claims, 3 Drawing Sheets

REDUCED NOISE VALVE STACK CONNECTION

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to relief valves and, more particularly, to a uniquely configured silencer system which is specifically adapted to accommodate thermal expansion displacements that may occur in piping systems through which high-pressure fluid is vented. The silencer system is configured to facilitate a reduction in unwanted noise created by the flow of the fluid by eliminating noise-generating sources created by the flow.

Vent silencers have been employed in various industries to muffle high velocity air or gas, including steam, which is flowing or venting to the atmosphere. For example, vent silencers are often used in conjunction with pressure relief valves or safety valves of the type utilized in high-pressure, high temperature steam service for relieving over-pressure from steam generating equipment. In this regard, it is not uncommon for the discharge from such high capacity safety valves to achieve sonic or near sonic velocity in the vent stack leading to the atmosphere such that the vent stack transmits the noise created at the safety valve as well as the noise generated as a result of the discharge of the flow to the atmosphere.

Various federal regulations have been created which stringently regulate the noise level that may be generated by such discharging safety valves. As a result, there has been developed in the prior art various types of silencer systems which are adapted to muffle a sonic gas, steam, or air stream. In the prior art, silencer systems are often used in an approach known as the "path treatment" of noise. In the path treatment approach, noise-generation is allowed to take place, with the noise-absorbing elements of the silencer systems being operative only to absorb the noise that has already physically been generated.

An alternative approach to noise reduction is known as "source treatment". The source treatment approach relies on reducing the strength of the source of noise by various means including the control or reduction of fluid velocity. Source treatment applications may include wire meshes, metal foam, or equivalents that are placed into the flow path of the gas, steam or air jet in such a way that noise-generating mechanisms are weakened to a point wherein a high degree of noise reduction is achieved.

Prior art silencer systems have incorporated the path treatment approach for achieving noise reduction utilizing noise-absorbing elements to absorb noise that has been generated. One such prior art silencer system utilized for safety valves includes a vent stack that is connected to a drip pan. The vent stack is typically connected to the drip pan in a manner wherein an air gap separates the vent stack from the drip pan. The air gap is usually located near the safety valve which is usually positioned at a level that is easily accessible to plant personnel.

The drip pan provides a measure of corrosion protection for upstream components by collecting condensation as well as accumulations of melted snow and rain that may enter the vent stack. The drip pan also allows for a limited amount of relative movement between the vent stack and the drip pan due to thermal expansion. Thermal expansion of the silencer system occurs due to the flow of the high-pressure, high temperature fluid through the silencer system. Such thermal expansion creates excessive bending moments and deflective forces at an inlet to the silencer system. The drip pan silencer system is configured to absorb thermal growth motions in order minimize excessive stresses such that the useful life of the silencer system may be extended.

Unfortunately, drip pan silencer systems include inherent safety risks to plant personnel due to steam "blowback" through the air gap during conditions of high flow through the vent stack wherein excessive back pressure in the vent stack may cause high-temperature steam to escape through the air gap. Furthermore, the air gap may expose nearby plant personnel and expensive equipment to the risk of harm from excessive noise escaping through the air gap.

The present invention addresses these deficiencies by providing a silencer system which falls within the source treatment category and which may additionally be configured to include elements falling into the path treatment category. Additionally, the silencer system of the present invention is configured such that the risk of harm to personnel and equipment from high-temperature steam and excessive noise is minimized. Furthermore, the reduction in noise effected by the silencer system of the present invention may eliminate the need for costly vent stack insulation as well permit the use of smaller, more economical silencer system piping. Finally, the silencer system of the present invention may eliminate noise-generating sources created by fluid flowing from the relief valve such that the need for additional downstream silencing equipment may be reduced with a resulting savings in direct costs of the silencing equipment as well as the associated indirect costs of installing the equipment.

BRIEF SUMMARY OF THE INVENTION

The present invention is a uniquely configured silencer system specifically adapted to allow for thermal growth thereof while attenuating noise created by expansion of high-pressure fluid flowing therethrough. During relief of over-pressure within a piping system, high-pressure fluid may be periodically vented by means of a valve such as a pressure relief valve or a safety valve. The silencer system of the present invention comprises an inner sleeve, a flexible bellows, a vent stack and a muffler disc disposed above the inner sleeve. The bellows is configured to allow for axial movement and/or lateral movement of the inner sleeve relative to the vent stack such as may occur as a result of thermal growth motions from heating of the silencer system during expansion of the fluid within the silencer system.

The bellows is configured to minimize or eliminate excessive forces and bending moments in the silencer system caused by thermal expansion in the vent stack and in the inner sleeve. Importantly, the muffler disc may be oriented relative to the inner sleeve such that high-pressure fluid exits the inner sleeve and impinges the muffler disc prior to creating shockwaves. If allowed to expand freely when exiting the inner sleeve, the high-pressure fluid may result in the generation of shockwaves accompanied by extremely high noise levels. Advantageously, the silencer system of the present invention is specifically adapted to prevent such shockwaves from forming.

The inner sleeve is configured as an elongate, tubular shape which defines a flow path having a sleeve inlet and a sleeve outlet. The sleeve inlet may be joined to a valve such as the safety valve mentioned above. The inner sleeve is concentrically disposed within the flexible bellows which also has a generally tubular shape with an upper end and a lower end. The bellows has the inner sleeve being disposed in spaced relation therewithin to define an inner annular gap between the bellows and the inner sleeve. The bellows is affixed to the inner sleeve at the upper end such that the inner annular gap is closed off. The vent stack has an elongate, tubular configuration and is oriented such that the bellows is concentrically disposed in spaced relation therewithin to define an outer annular gap. The vent stack is affixed to the bellows at the lower end thereof such that the outer annular gap is closed off. The vent stack may extend upwardly in a constant cross-section where it may be anchored to a supporting structure such as a building roof. In sensitive environments such as residential communities wherein greater noise reduction may be required, a blowoff silencer may be mounted atop the vent stack.

The muffler disc is oriented above the sleeve outlet of the inner sleeve although the muffler disc may be disposed directly upon (i.e., in direct contact with) the sleeve outlet. The muffler disc may preferably be oriented relative to the sleeve outlet such that the fluid impinges the muffler disc prior to creating shockwaves. The introduction of high-pressure fluid such as steam into the inner sleeve of the silencer system facilitates the formation of an underexpanded flow emanating from the sleeve outlet. The flow may accelerate to supersonic speed upon reaching the relatively lower pressure area of the vent stack surrounding the sleeve outlet.

If allowed to freely expand, the flow will result in the eventual formation of a shockwave downstream of the sleeve outlet. Akin to the shockwave sometimes visible in the exhaust plume of a military fighter jet engine, such a shockwave emanating from the sleeve outlet may result in the production of extremely high noise levels. The muffler disc of the present invention is specifically configured and oriented above the inner sleeve to prevent such shockwave from forming and to suppress noise generated by other phenomena in a manner which will be described in more detail below.

The muffler disc may be fabricated from a noise absorbing or noise reducing material such as a generally porous material. Metal foam or wire mesh may be utilized to form the muffler disc into a puck or a disc shape having generally flat, opposed ends and a generally cylindrically-shaped side. The opposed ends define a thickness of the muffler disc. The wire mesh may be fabricated from a sintered material such as stainless steel. Alternatively, the muffler disc may be fabricated from compressed wire mesh such as woven wire mesh material that is compressed into a less porous material. The particular material section, muffler disc geometry, and spacing from the sleeve outlet may be optimized for a given set of performance requirements of the silencer system.

A tubular inlet diffuser may be mounted on the upper end of the bellows between the sleeve outlet and the muffler disc in a manner such that the inlet diffuser spaces the muffler disc away from the sleeve outlet. By spacing the muffler disc away from the sleeve outlet, the fluid may escape the inner sleeve through inlet diffuser passages in an unrestricted manner. The inlet diffuser passages extend radially through the inlet diffuser. Furthermore, the inlet diffuser passages may be advantageously arranged such that fluid exiting therethrough may enter the vent stack in a substantially uniformly distributed pattern.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
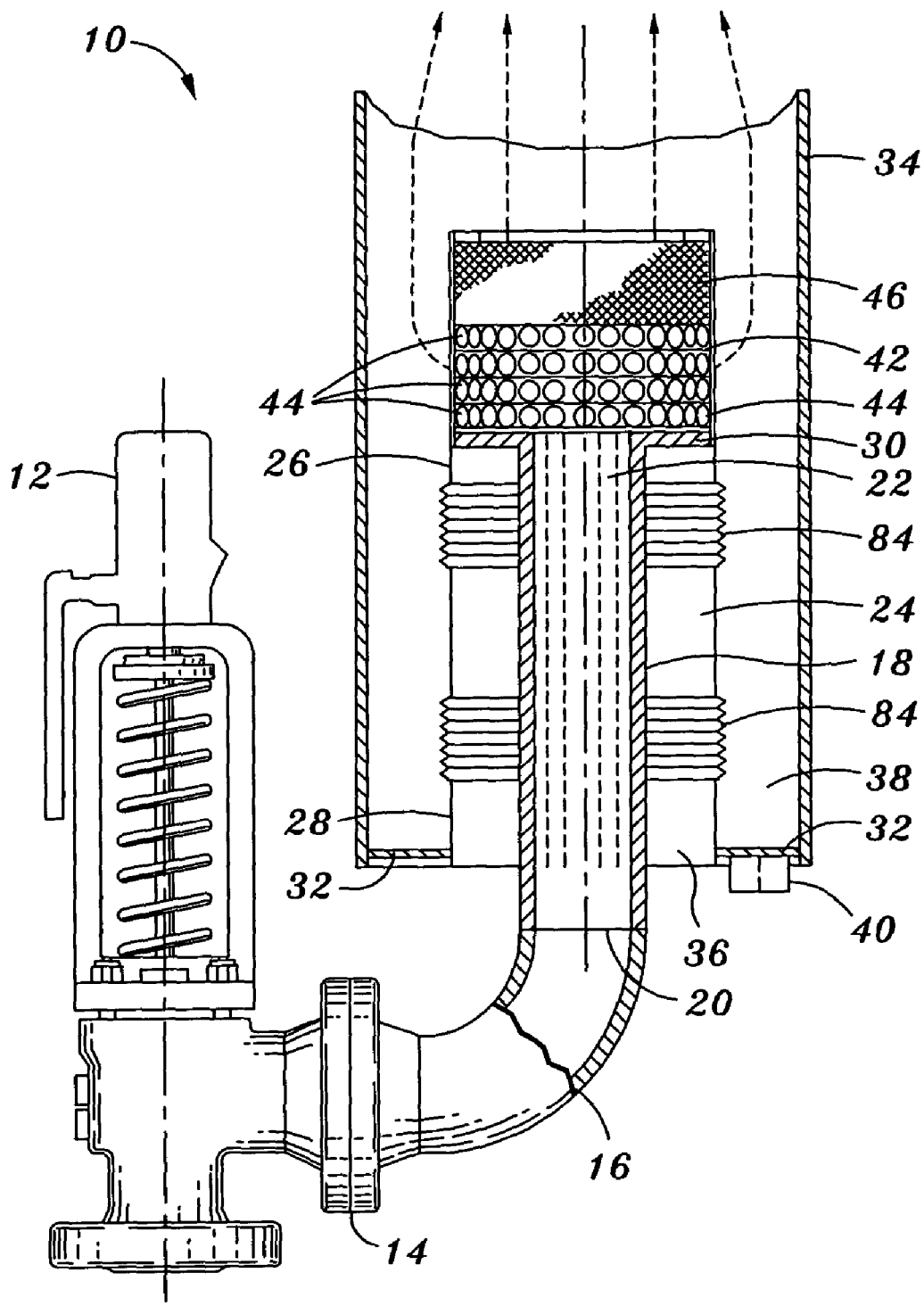
FIG. 1 is a cross-sectional view of a silencer system of the present invention illustrating an inner sleeve thereof being fluidly connected to a relief valve.

Referring now to the drawings wherein the showings are for purposes of illustrating preferred embodiments of the present invention only, and not for purposes of limiting the same, FIG. 1 illustrates in cross section a silencer system 10 fluidly connected to a relief valve 12. The silencer system 10 comprises an inner sleeve 18, a flexible bellows 24, a vent stack 34 and a muffler disc 46 disposed above the inner sleeve 18. Importantly, the muffler disc 46 may be oriented relative to the inner sleeve 18 such that high-pressure fluid exits the inner sleeve 18 and impinges the muffler disc 46 prior to creating shockwaves. As will be recognized, the generation of shockwaves may result in the production of extremely high noise levels. The silencer system 10 of the present invention is specifically adapted to prevent such shockwaves from forming, as will be described in greater detail below.

Figure 2:
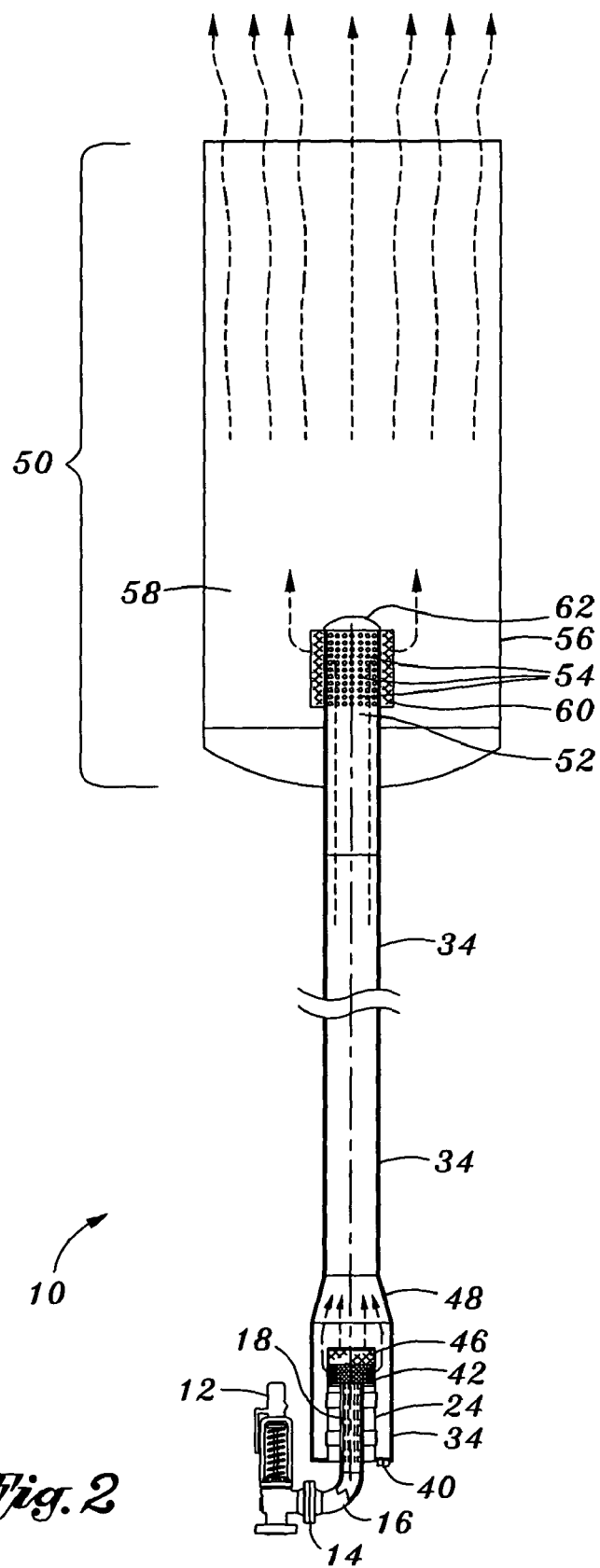
FIG. 2 is a cross-sectional view of the silencer system with a blowoff silencer mounted atop a vent stack of the silencer system.
Figure 3:
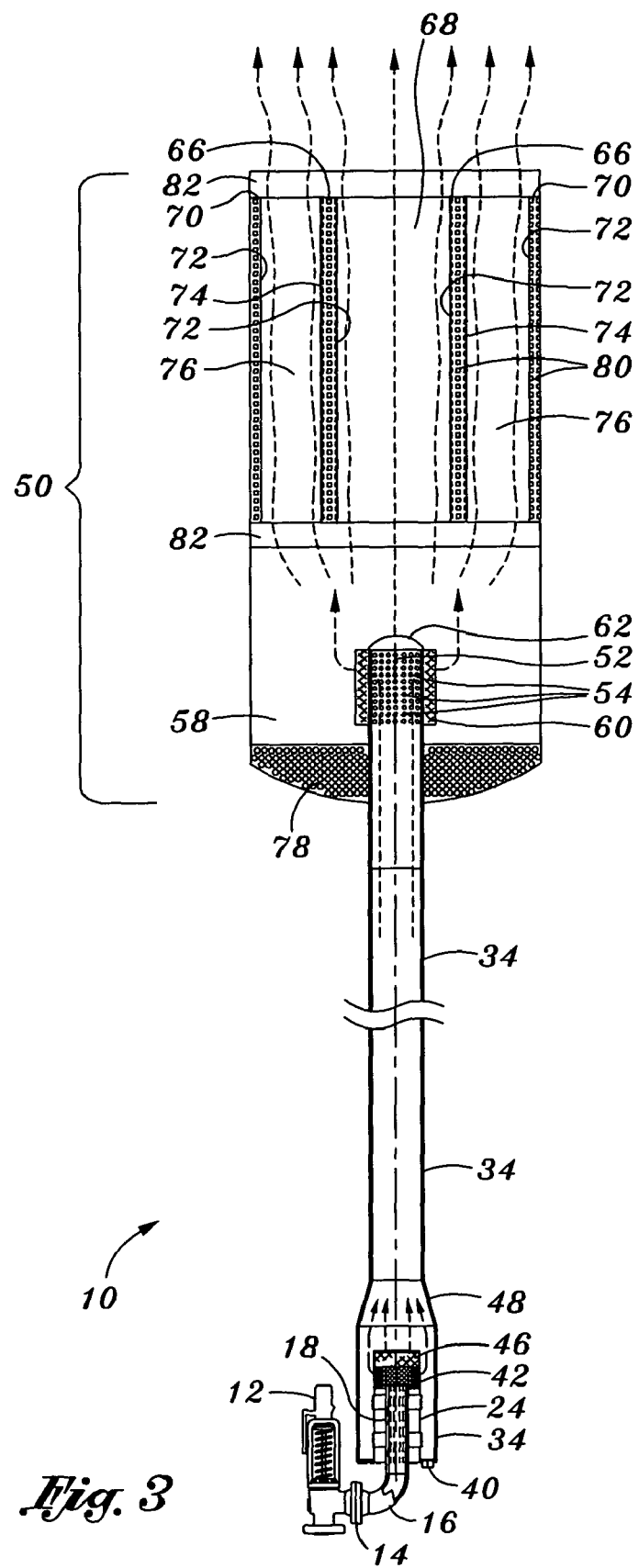
FIG. 3 is a cross-sectional view of the silencer system illustrating an acoustic core assembly mounted within the blowoff silencer.

The inner sleeve 18 may be configured as an elongate, tubular shape which defines a flow path having a sleeve inlet 20 and a sleeve outlet 22. The inner sleeve 18 may have a cylindrical shape. The sleeve inlet 20 may be joined to a valve such as a safety valve or a relief valve 12, as is shown in FIGS. 1, 2 and 3. Shown in FIG. 1 is a 90° elbow 16 joining the sleeve inlet 20 to the relief valve 12. The elbow 16 may include a flange disposed on an end opposite that which is joined to the inner sleeve 18. The relief valve 12 may include a mating flange such that the relief valve 12 and the silencer system 10 may be joined together with mechanical fasteners. Alternatively, the relief valve 12 may be joined to the silencer system 10 by welding or by other suitable means.

Referring still to FIG. 1, the inner sleeve 18 is concentrically disposed within the flexible bellows 24 which has a generally tubular shape with an upper end 26 and a lower end 28. The bellows 24 may also have a cylindrical shape with the inner sleeve 18 being disposed in spaced relation therewithin to collectively define an inner annular gap 36 between the bellows 24 and the inner sleeve 18. The bellows 24 is affixed to the inner sleeve 18 at the upper end 26 such that the inner annular gap 36 is closed off. An annular bellows bulkhead 30 may be utilized to close off the inner annular gap at the upper end 26 of the bellows 24 wherein the bellows bulkhead 30 is interposed in sealing engagement between the inner sleeve 18 and the bellows 24. The bellows bulkhead 30 may be fabricated from imperforate plate material such that fluid is contained within the vent stack 34.

The vent stack 34 has an elongate, tubular configuration and is oriented such that the bellows 24 is concentrically disposed in spaced relation therewithin to collectively define an outer annular gap 38, as can be seen in FIG. 1. The vent stack 34 is affixed to the bellows 24 at the lower end 28 thereof such that the outer annular gap 38 is closed off. A stack bulkhead 32 may be interposed in sealing engagement between the inner sleeve 18 and the bellows 24 at the upper end 26 thereof. The stack bulkhead 32 may be fabricated from imperforate plate material and may be configured to close off the outer annular gap 38 such that fluid is contained within the vent stack 34.

By configuring the silencer system 10 such that the outer annular gap 38 is closed off by the stack bulkhead 32 or by other suitable means, expensive equipment installed near the relief valve 12 may be protected from the harmful effects of excessive heat, noise and vibration during venting of high-pressure fluid through the silencer system 10. In addition, by closing off the outer annular gap 38, a relatively smaller vent stack 34 may be utilized as compared to prior art drip pan silencer systems that have an air gap separating a vent stack from a drip pan and which require a relatively large vent stack diameter in order to minimize back pressure. Thus, the silencer system 10 of the present invention may be more economical than drip pan silencer systems of the prior art.

An open-threaded or sleeved drain coupling 40 may be installed in the stack bulkhead 32, as can be seen in FIG. 1. The drain coupling 40 may be attached to the stack bulkhead 32 such that condensation and accumulations of rain and melted snow may be continuously drained from the vent stack 34 in order to minimize corrosion as well as to ensure that slugs of fluid do not develop in the silencer system 10 creating the risk of damage to downstream components during operation of the relief valve 12. A steam trap (not shown) may be added to the silencer system 10 to catch fluid that may accumulate as a result of nominal back pressure within the silencer system 10.

As can be seen in FIGS. 2 and 3, the vent stack 34 may extend upwardly in a constant cross-section. Depending on the geometry of a building or structure in which the silencer system 10 may be installed, the vent stack 34 may extend vertically upwardly where it may be anchored to supporting structure such as to a roof. However, it is contemplated that the silencer system 10 including the vent stack 34 may be horizontally disposed such that the silencer system 10 is anchored to an exterior wall. When horizontally disposed, pipe alignment guides may be included in the vent stack 34 to prevent buckling of the vent stack 34 and to assure proper functioning of the silencer system 10. In sensitive environments wherein greater noise reduction may be required, a blowoff silencer 50 may be mounted atop the vent stack 34 wherein the high-pressure fluid may discharge directly into the atmosphere, as will be described in greater detail below.

Importantly, the bellows 24 is configured to allow for axial movement and/or lateral movement of the inner sleeve 18 relative to the vent stack 34. Such relative movement may occur as a result of thermal growth motions resulting from heating of the silencer system 10 due to the expansion of the high-temperature, high-pressure fluid within the silencer system 10 as fluid travels from the relief valve 12 through the silencer system 10 before discharging into the atmosphere. The bellows 24 is configured to minimize or eliminate excessive forces and bending moments at the silencer inlet caused by thermal expansion in the vent stack 34 and in the inner sleeve 18. Thus, the bellows 24 is configured to prevent excessive stress buildup within the silencer system 10 that may otherwise result in stress cracking leading to premature structural failure of the silencer system 10. In this regard, the bellows 24 may extend the useful life of the silencer system 10 as well as the useful life of components that are connected thereto, such as the relief valve 12 shown in FIGS. 1, 2 and 3.

The bellows 24 is a flexible element configured to join the inner sleeve 18 with the vent stack 34 and allow the inner sleeve 18 to move independently of the vent stack 34. The bellows 24 may be fabricated with continuous convolutions running the length of the bellows 24. The upper end 26 and the lower end 28 of the bellows 24 may be respectively joined to the inner sleeve 18 and the vent stack 34 in the manner described above. Alternatively, the bellows 24 may be fabricated in the configuration shown in FIG. 1 wherein two spaced-apart convoluted sections 84 are formed within a straight tubular section of the bellows 24. In such a configuration, the upper and lower ends 26, 28 of the bellows 24 may be cylindrically shaped such that respective ones of the inner sleeve 18 and vent stack 34 may be readily joined thereto.

Regarding its construction, the bellows 24 may be fabricated in a single ply. Alternatively, the bellows 24 may be fabricated in multiple plies in order to prevent premature fatigue failures resulting from repeated deflections. Such repeated deflection may induce cyclic bending stresses which can cause cracking in joints. The bellows 24 may preferably be fabricated of relatively thin material in order to enhance the lateral flexibility of the bellows 24. As was earlier mentioned, the bellows 24 is configured to protect upstream and downstream components such as the relief valve 12 and the inner sleeve 18 from excessive bending moments and deflection forces. However, the bellows 24 may also be configured to compensate for misalignment of the silencer system 10 and to absorb vibration.

In this regard, the configuration of the bellows 24 may be optimized with varying combinations of diameter, length, quantity of convoluted sections 84, convolution height and width, and bellows 24 wall thickness in order to accommodate the performance requirements of a given application. A preferred material from which the flexible bellows 24 may be fabricated is stainless steel such as T-316L stainless steel in order to provide the bellows 24 with excellent corrosion resistance and superior fatigue cycle life. However, it is recognized herein that there are many other materials that are suitable for fabricating the bellows 24.

The muffler disc 46 is shown in FIG. 1 as being oriented above the sleeve outlet 22 of the inner sleeve 18 although the muffler disc 46 may be disposed directly thereupon. As was earlier mentioned, the muffler disc 46 may preferably be oriented relative to the sleeve outlet 22 such that the fluid impinges the muffler disc 46 prior to creating shockwaves. The introduction of high-pressure fluid such as steam into the inner sleeve 18 of the silencer system 10 facilitates the formation of an underexpanded flow which emanates from the sleeve outlet 22 of the inner sleeve 18. The flow may accelerate to supersonic speed upon reaching the relatively lower pressure area of the vent stack 34 surrounding the sleeve outlet 22.

Once exiting the sleeve outlet 22 of the inner sleeve 18, the flow begins to freely expand, resulting in the eventual formation of a shockwave downstream of the sleeve outlet 22. As will be recognized, a shockwave emanating from the sleeve outlet 22 may result in the production of extremely high noise levels. Other phenomena associated with supersonic flow velocities also contribute to the high noise levels.

The muffler disc 46 of the present invention is specifically configured and oriented to prevent such shockwave from forming and to suppress noise generated by the other phenomena.

The muffler disc 46 may be fabricated from a noise absorbing or noise reducing material. Generally porous material may be selected as the noise reducing material and may include metal foam or wire mesh formed in the shape of a disc or puck having generally flat ends defining a thickness of the muffler disc 46, as can be seen in FIG. 1. The muffler disc 46 may also be configured to be generally cylindrically shaped and may be sized to be complementary to the upper end 26 of the bellows 24. However, the muffler disc 46 may be configured in any number of alternate shapes and sizes. The wire mesh may preferably be a sintered material such as stainless steel due to its favorable corrosion resistance and high strength properties at elevated temperatures typical of fluids such as steam that may be periodically vented from relief valves.

The muffler disc 46 may also be fabricated from compressed wire mesh such as woven wire mesh material that is compressed into a less porous material. As will be recognized, the thickness of the muffler disc 46 may be varied according to the requirements of the applications in which the silencer system 10 is installed. Whether the muffler disc 46 is fabricated from wire mesh material, metal foam or any other noise reduction material, the thickness of the muffler and the spacing thereof from the sleeve outlet 22 may be varied and selected based upon a particular application. Along these lines, the particular material section for the muffler may also be based upon the application as may other parameters such as mesh size (if wire mesh is utilized) or porosity (if metal foam is utilized).

Referring still to FIG. 1, a tubular inlet diffuser 42 may be mounted on the upper end 26 of the bellows 24 between the sleeve outlet 22 and the muffler disc 46. The inlet diffuser 42 may have a plurality of inlet diffuser passages 44 extending radially therethrough. When incorporated into the silencer system 10, the inlet diffuser 42 may advantageously be utilized to fixedly maintain the muffler disc 46 in spaced relation with the sleeve outlet 22 such that fluid may escape the inner sleeve 18 through the inlet diffuser passages 44.

By including the inlet diffuser 42 between the sleeve outlet 22 and the muffler disc 46, fluid may exit the inner sleeve 18 in an unrestricted manner. The inlet diffuser passages 44 may be advantageously arranged such that fluid exiting therethrough may enter the vent stack 34 in a predetermined pattern such as a substantially uniformly distributed pattern. The configuration (i.e., the quantity, size and spacing) of inlet diffuser passages 44 may be determined based upon a predicted back pressure of the vent stack 34 during operation of the relief valve 12.

For example, the inlet diffuser passages 44 may be evenly spaced about the inner sleeve 18. The inlet diffuser 42 may further be configured to provide a reduction in pressure of fluid escaping the sleeve outlet 22 as a result of the flow of the high-pressure fluid (e.g., steam) through the inlet diffuser passages 44. It will be recognized that the size, quantity and spacing of the inlet diffuser passages 44 may be configured such that a pressure reduction capability of the inlet diffuser 42 may be optimized or maximized for a given set of flow conditions and performance requirements. Such pressure reduction of the fluid may facilitate a reduction in noise that may be discharged into the atmosphere.

A muffler disc 46 retainer (not shown) may be disposed on the muffler disc 46. The muffler disc 46 retainer may be configured to secure the muffler disc 46 to the inner sleeve 18 or the inlet diffuser 42 (if included) and may comprise a circumferential band extending around an upper edge of the muffler disc 46. Alternatively, the muffler disc 46 retainer may comprise orthogonally arranged, spaced-apart straps extending across an upper end 26 of the muffler disc 46. The inlet diffuser 42 may be sized to be complementary to the upper end 26 of the bellows 24. Likewise, the muffler disc 46 may be sized to be complementary to the inlet diffuser 42.

Turning now to FIG. 2, shown is the silencer system 10 having a stack reducer 48 and the blowoff silencer 50. The blowoff silencer 50 is mounted within or atop the vent stack 34 and is configured to provide increased noise reduction capability over that which is provided by the silencer system 10 configuration shown in FIG. 1. The blowoff silencer 50 may be welded to the vent stack 34 or it may be joined to the vent stack 34 via radially-outturned flanges connected with securing bolts in a manner similar to that shown in the piping joint 14 of FIG. 1. However, it is recognized herein that there are many other suitable means that may be utilized for mounting the blowoff silencer 50 to the vent stack 34. Referring still to FIG. 2, shown is the stack reducer 48 which may be welded to the vent stack 34 at a location above the muffler disc 46. The stack reducer 48 is configured for reducing the size of the vent stack 34. In environments where increased noise reduction capability is required, the blowoff silencer 50 may be included. The blowoff silencer 50 is configured to intercept and reduce noise energy before it escapes into the environment. It should be noted that in comparison to prior art silencer systems, the reduction in noise generated at the source (i.e. the relief valve 12) by the silencer system 10 of the present invention may reduce or eliminate the need for a blowoff silencer 50.

The blowoff silencer 50 of FIG. 2 is comprised of a tubular vent diffuser 52 and a blowoff silencer shell 56. The vent diffuser 52 is fluidly connected to the vent stack 34 and has a plurality of vent diffuser passages 54 extending radially therethrough. The blowoff silencer shell 56 has the vent diffuser 52 concentrically disposed in spaced relation therewithin to collectively define an expansion chamber 58. The blowoff silencer shell 56 is joined in sealing engagement to and extends laterally around the vent stack 34 and upwardly past the vent diffuser 52. Both the vent diffuser 52 and the blowoff silencer shell 56 are of elongate, tubular configuration and both may be cylindrically shaped.

The vent diffuser 52 may be generally constructed as a pressure vessel having a wall thickness that is sized to prevent disintegration under dynamic cyclic loading of incoming high-pressure fluid. An end cap 62 may be disposed in sealing engagement to the vent diffuser 52. The end cap 62 may be dome shaped as is shown in FIG. 2 and may be configured for blocking fluid flowing through the vent diffuser 52 such that the fluid passes radially outwardly through the vent diffuser passages 54. The vent diffuser passages 54 may be arranged in a manner similar to the inlet diffuser passages 44 such that fluid flows into the expansion chamber 58 in a predetermined pattern such as in a uniformly circumferential pattern. The vent diffuser passages 54 may be sized and configured to create a barrier to noise transmitted from upstream components such as the relief valve 12 shown in FIG. 2. The vent diffuser 52 passage size and spacing may be optimized in order to maximize the effectiveness with which noise is reduced.

The expansion chamber 58, collectively defined by the blowoff silencer shell 56 and the vent diffuser 52, is configured to further constrain noise generated at the vent diffuser 52 as well as that created by turbulence of fluid as it enters the expansion chamber 58 through the vent diffuser passages 54. The blowoff silencer shell 56 may be configured with single wall construction or with multiple wall construction to provide additional resistance to noise radiation through the blowoff silencer shell 56. The expansion chamber 58 is configured to reduce silencer system 10 noise in a low frequency range.

Referring still to FIG. 2, a tubular vent muffler 60 may be included with the blowoff silencer 50. The vent muffler 60 has the vent diffuser 52 concentrically positioned therewithin. The vent muffler 60 is configured to attenuate noise that may be generated by supersonic jets that may be defined by the flow of fluid out of the vent diffuser passages 54. The jets emanating from the vent diffuser passages 54 may accelerate to supersonic speed upon exiting the vent diffuser passages 54. Upon exiting the vent diffuser passages 54, the jets may begin to expand which, like the flow discharging from the sleeve outlet 22, may result in the eventual formation of shockwaves. Such shockwaves may in turn result in the production of extremely high noise levels. The vent muffler 60 may be oriented relative to the vent diffuser 52 such that the jets impinge the vent muffler 60 prior to creating shockwaves. In this regard, the vent muffler 60 may be disposed such that it is in direct contact with the vent diffuser 52 or, alternatively, in spaced relation with the vent diffuser 52.

Turning now to FIG. 3, shown is the silencer system 10 with an acoustic core assembly 64 disposed within the expansion chamber 58 above the vent diffuser 52. The acoustic core assembly 64 may be included to further attenuate noise before its discharge into the atmosphere. The level of noise produced by the configuration of the silencer system 10 as shown in FIG. 3 may be low enough such that the silencer system 10 may be utilized in residential communities. The acoustic core assembly 64 includes an elongate, tubular inner core 66 and an elongate, tubular outer core 70 having the inner core 66 concentrically disposed therewithin. The inner core 66 has perforated inner and outer face sheets 72, 74 with acoustic pack material 80 being disposed therebetween. The inner and outer cores 66, 70 may each be cylindrically shaped. The inner face sheet 72 of the inner core 66 may also be cylindrically shaped such that the inner face sheet 72 defines an inner flow path 68.

In the configuration shown in FIG. 3, the outer core 70 has a perforated inner face sheet 72 disposed in spaced relation to the blowoff silencer shell 56 with acoustic pack material 80 being disposed therebetween. Bulkheads (not shown) may be included at upper and lower ends 26, 28 of respective ones of the inner and outer cores 66, 70 to further retain the acoustic pack material 80. The acoustic pack material 80 may be comprised of glass fiber material such as long-strand or long-loomed glass fibers. Such glass fibers may be spooled into position rather than filled from one end for consistent density throughout each one of the inner and outer cores 66, 70.

In the acoustic core assembly 64, the inner core 66 may be concentrically disposed in spaced relation to the outer core 70 with an annular core passageway 76 defined therebetween, as can be seen in FIG. 3. The annular core passageway 76 is configured such that fluid may flow upwardly from the expansion chamber 58 through the inner flow path 68 and through the annular core passageway 76 before exiting the blowoff silencer 50. The perforated inner and outer face sheets 72, 74 of the inner core 66 and the perforated inner face sheet 72 of the outer core 70 are configured to provide an acoustic path along which noise energy may be dissipated into the acoustic pack material 80. Annular spacing of the inner and outer core 66, 70 and length of the inner and outer core 66, 70 may be varied in order to provide optimum attenuation of noise at a predominate frequency of noise produced by the vent diffuser 52.

Internal supports 82 may be included at upper and lower ends of the acoustic core assembly 64. The internal supports 82 are configured to support the acoustic core assembly 64 axially and laterally. A lower portion of the expansion chamber 58 may include sound-absorbing material 78 to provide additional resistance against direct noise radiation through the blowoff silencer shell 56. The sound-absorbing material 78 may be comprised of material capable of withstanding high temperatures at the vent diffuser 52 resulting from the impact of the high-pressure fluid. Thus, rock fiber, glass fiber, or scoria, a cindery material, may be preferably utilized as the sound-absorbing material 78.

Though the acoustic core assembly 64 is shown in FIG. 3 as having only the inner core 66 and the outer core 70, those of ordinary skill in the art will recognize that one or more additional ones of the inner core 66 may be included without departing from the spirit and scope of the present invention. For example, if dictated by need in accordance with sound reduction requirements, the inner core 66 could be concentrically positioned in spaced relation with yet another one of the inner cores 66 having inner and outer face sheets 72, 74 and acoustic pack material 80 captured therebetween. Such an arrangement could be repeated as needed in order to achieve the desired noise attenuation or noise reduction requirements.

In operation, high-pressure fluid such as steam is vented from the relief valve 12. Flowing at high velocity, the high-pressure fluid enters the inner sleeve 18 at the sleeve inlet 20 whereupon it flows axially upwardly through the inner sleeve 18. The discharge of the high-pressure fluid out of the inner sleeve 18 facilitates the formation of an underexpanded flow which emanates from the sleeve outlet 22. The flow may accelerate to supersonic speed upon reaching the relatively lower pressure area surrounding the sleeve outlet 22 resulting in the eventual formation of a shockwave downstream of the sleeve outlet 22. The shockwave may result in the production of high noise levels.

Advantageously, the muffler disc 46 is oriented relative to the sleeve outlet 22 in a manner wherein the muffler disc 46 prevents such shockwave from forming. The inlet diffuser 42, if included in the silencer system 10, may be mounted on the upper end 26 of the bellows 24 between the sleeve outlet 22 and the muffler disc 46 such that fluid may escape the inner sleeve 18 through the inlet diffuser passages 44 and into the expansion chamber 58. After exiting the inner sleeve 18 and expanding into the vent stack 34, the fluid flows upwardly toward an end of the vent stack 34 whereupon it may be discharged into the atmosphere.

The expansion of the fluid within the silencer system 10 results in thermal heating of the silencer system 10 that may result in axial and/or lateral movement of the inner sleeve 18 relative to the vent stack 34. Advantageously, such relative movement is absorbed by the flexible bellows 24 such that excessive deflections and bending moment forces upon the silencer system 10 and/or relief valve 12 may be avoided. For silencer configurations having the blowoff silencer 50, noise may be further attenuated by the vent diffuser 52, the expansion chamber 58 and the acoustic core assembly 64. The flow traveling upwardly from a lower end of the vent stack 34 enters the vent diffuser 52 before passing through the vent diffuser passages 54 and through the vent muffler 60, if included. The expansion chamber 58 is configured to further constrain noise generated at the vent diffuser 52. The acoustic core assembly 64 additionally attenuates noise due to the sound absorbing qualities of the acoustic pack material 80 as the fluid flows past the perforated inner and outer face sheets 72, 74 of the inner and outer core 66, 70.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A silencer system configured to allow for thermal growth thereof while attenuating noise created by expansion of high-pressure fluid flowing therethrough, the silencer system comprising:
    a tubular inner sleeve having a sleeve inlet and a sleeve outlet;
    a tubular flexible bellows having upper and lower ends and having the inner sleeve concentrically disposed in spaced relation therewithin to define an inner annular gap, the bellows being affixed to the inner sleeve at the upper end such that the inner annular gap is closed off;
    a tubular vent stack having the bellows concentrically disposed in spaced relation therewithin to define an outer annular gap, the vent stack being affixed to the bellows at the lower end such that the outer annular gap is closed off; and
    a muffler disc mounted above the sleeve outlet;
    wherein the bellows is configured to allow for axial and lateral movement of the inner sleeve relative to the vent stack.

2. The silencer system of claim 1 wherein the muffler disc is oriented relative to the sleeve outlet such that the fluid impinges the muffler disc prior to creating shockwaves.

3. The silencer system of claim 2 wherein the muffler disc is disposed in spaced relation to the sleeve outlet.

4. The silencer system of claim 2 further comprising:
    a tubular inlet diffuser mounted on the upper end of the bellows between the sleeve outlet and the muffler disc and having a plurality of inlet diffuser passages extending radially therethrough;
    wherein the inlet diffuser passages are arranged such that fluid exiting therethrough may enter the vent stack in a predetermined pattern.

5. The silencer system of claim 4 wherein the predetermined pattern is configured such that fluid enters the vent stack in a substantially uniformly distributed pattern.

6. The silencer system of claim 4 wherein the inlet diffuser is sized to be complementary to the upper end of the bellows.

7. The silencer system of claim 4 wherein the muffler disc is sized to be complementary to the inlet diffuser.

8. The silencer system of claim 4 further comprising a bellows bulkhead interposed in sealing engagement between the inner sleeve and the bellows at the upper end thereof and being configured to close off the inner annular gap.

9. The silencer system of claim 1 further comprising:
    a stack bulkhead interposed in sealing engagement between the vent stack and the bellows at the lower end thereof and being configured to close off the outer annular gap; and
    a drain coupling mounted in the stack bulkhead.

10. The silencer system of claim 1 wherein the muffler disc is fabricated from a porous material.

11. The silencer system of claim 10 wherein the porous material is metal foam.

12. The silencer system of claim 10 wherein the porous material is wire mesh.

13. The silencer system of claim 12 wherein the wire mesh is fabricated from sintered stainless steel.

14. The silencer system of claim 4 further comprising:
    a stack reducer interposed in the vent stack and configured to reduce the diameter thereof; and
    a blowoff silencer mounted atop the vent stack, the blowoff silencer including:
        a tubular vent diffuser fluidly connected to the vent stack and having a plurality of vent diffuser passages extending radially therethrough; and
        a tubular blowoff silencer shell having the vent diffuser concentrically disposed in spaced relation therewithin to define an expansion chamber, the silencer shell extending laterally around the vent stack and upwardly past the vent diffuser;
    wherein fluid flows radially outwardly through the vent diffuser passages and into the expansion chamber in a predetermined pattern.

15. The silencer system of claim 14 wherein the blowoff silencer further includes:
    a tubular vent muffler having the vent diffuser concentrically positioned therewithin;
    wherein a plurality of jets are defined by the flow of the fluid out of the vent diffuser passages, the vent muffler being oriented relative to the vent diffuser such that the jets impinge the vent muffler prior to creating shockwaves.

16. The silencer system of claim 14 wherein the blowoff silencer further includes:
    an acoustic core assembly disposed within the expansion chamber above the vent diffuser, the acoustic core assembly including:
        a tubular inner core having a perforated inner and outer face sheets with acoustic pack material being disposed therebetween, the inner face sheet defining an inner flow path; and
        a tubular outer core having a perforated inner face sheet disposed in spaced relation to the blowoff silencer shell with acoustic pack material being disposed therebetween;
    wherein the inner core is concentrically disposed in spaced relation to the outer core with an annular core passageway defined therebetween such that fluid flows upwardly from the expansion chamber through the inner flow path and the annular core passageway before exiting the blowoff silencer.

17. The silencer system of claim 16 wherein the acoustic pack material is glass fiber material.

18. The silencer system of claim 16 wherein the expansion chamber includes sound-absorbing material disposed at a lower portion thereof.

19. The silencer system of claim 18 wherein the sound-absorbing material is scoria.

20. The silencer system of claim 14 further comprising an end cap disposed in sealing engagement to the vent diffuser and configured for blocking fluid flowing therethrough such that the fluid passes radially outwardly through the vent diffuser passages.

* * * * *